United States Patent [19]
Miwa et al.

[11] Patent Number: 5,923,790
[45] Date of Patent: Jul. 13, 1999

[54] METHOD AND APPARATUS FOR DETECTING VERTICAL DIRECTION OF DOCUMENT

[75] Inventors: Tetsuya Miwa; Yoshinori Yamaguchi, both of Kyoto, Japan

[73] Assignee: Omron Corporation, Kyoto, Japan

[21] Appl. No.: 08/590,469

[22] Filed: Jan. 23, 1996

[30] Foreign Application Priority Data

Jan. 24, 1995 [JP] Japan .................................. 7-027212

[51] Int. Cl.⁶ .................................................. G06K 9/36
[52] U.S. Cl. ........................ 382/289; 382/170; 382/198
[58] Field of Search ................................. 382/112, 168, 382/169, 170, 171, 177, 190, 198, 202, 289, 290, 291, 200–203, 207, 295, 296, 297; 358/486, 488

[56] References Cited

U.S. PATENT DOCUMENTS 5,359,677 10/1994 Katsurada et al. ..................... 382/58
5,475,492 12/1995 Yukawa .................................. 382/168
5,668,898 9/1997 Tatsuta .................................. 382/290

FOREIGN PATENT DOCUMENTS 5-110814 4/1993 Japan ............................. H04N 1/387
5-274334 10/1993 Japan ............................. G06F 15/30

*Primary Examiner*—Thomas D. Lee
*Assistant Examiner*—Jerome Grant, II
*Attorney, Agent, or Firm*—Dickstein Shapiro Morin & Oshinsky LLP

[57] ABSTRACT

The present invention provides a method and an apparatus for reliably detecting the upside and downside vertical direction of an image, such as characters on a document. The method involves judging the upside and downside vertical direction of the characters in each line, and specifying the upside and downside vertical direction of the characters on the entire image on the basis of the vertical directions detected line by line.

9 Claims, 14 Drawing Sheets

PROJECTION LINE OF LINES

FIG. 7A
I like bananas.
→ SHADING-OFF, NORMALIZING
↓ EXTRACTING FEATURE QUANTITY
FIG. 7B
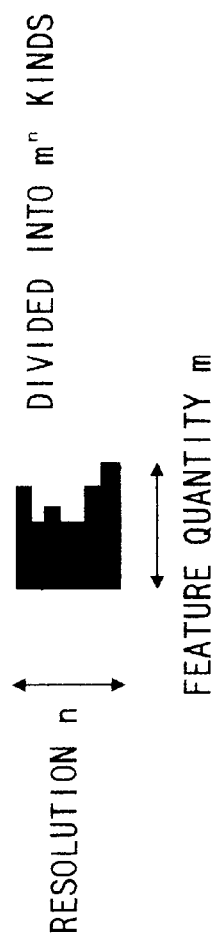
DIVIDED INTO $m^n$ KINDS
↕ FEATURE QUANTITY m
↔ RESOLUTION n
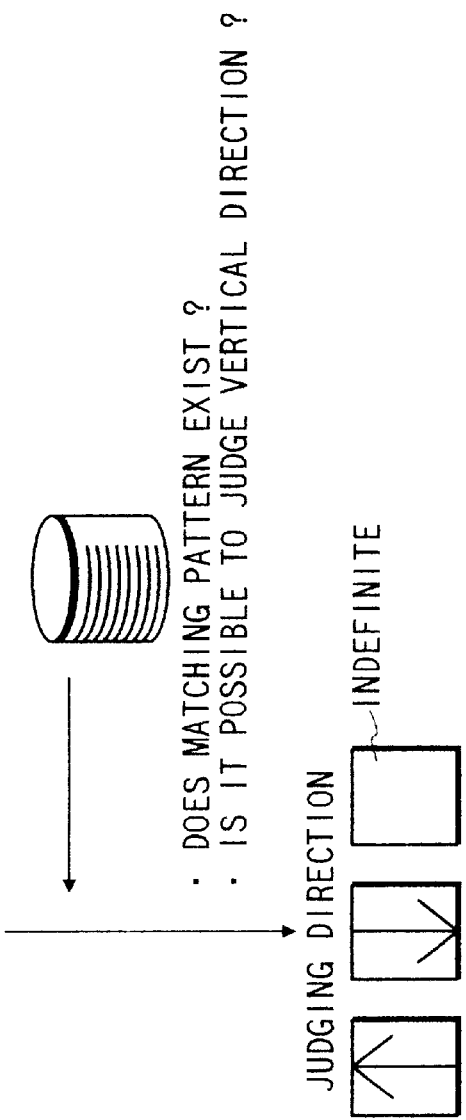
· DOES MATCHING PATTERN EXIST?
· IS IT POSSIBLE TO JUDGE VERTICAL DIRECTION?
JUDGING DIRECTION — INDEFINITE

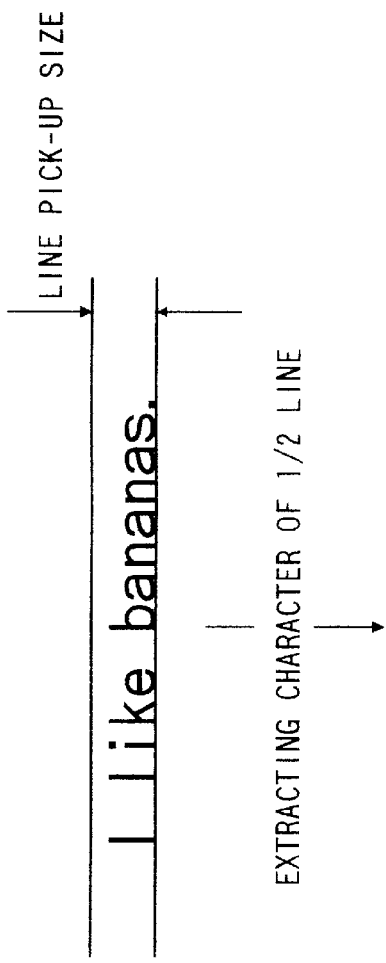
FIG. 8A
FIG. 8B
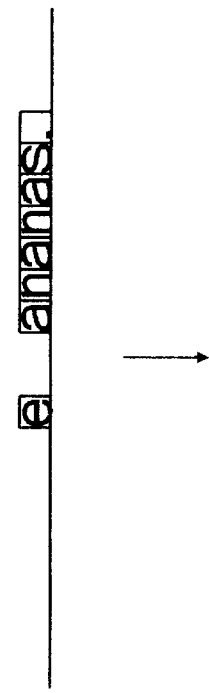
FIG. 8C
$Au = 0$
$Al = 8$
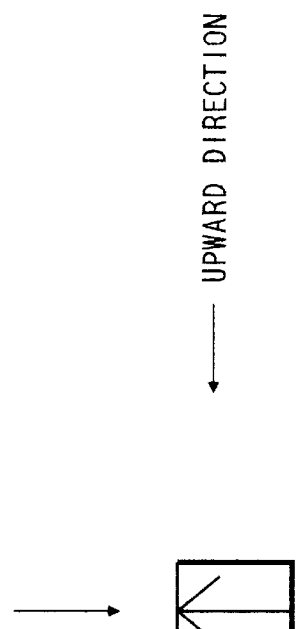
FIG. 8D

FIG. 9A
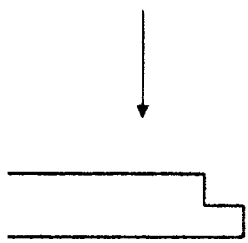
FIG. 9B
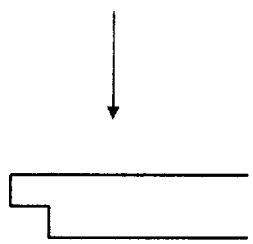 ← ATTENTION TO HEAD AND TAIL OF LINE
FIG. 9C
HEAD OF LINE :  → 
JUDGING
TAIL OF LINE :  → 
FIG. 11
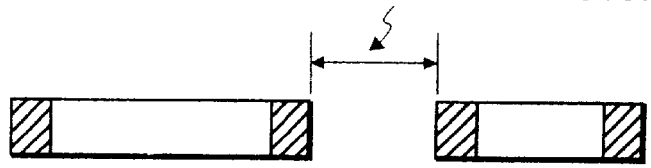
LONGER THAN PRESET DISTANCE ?
 PORTIONS ARE SUBJECTS

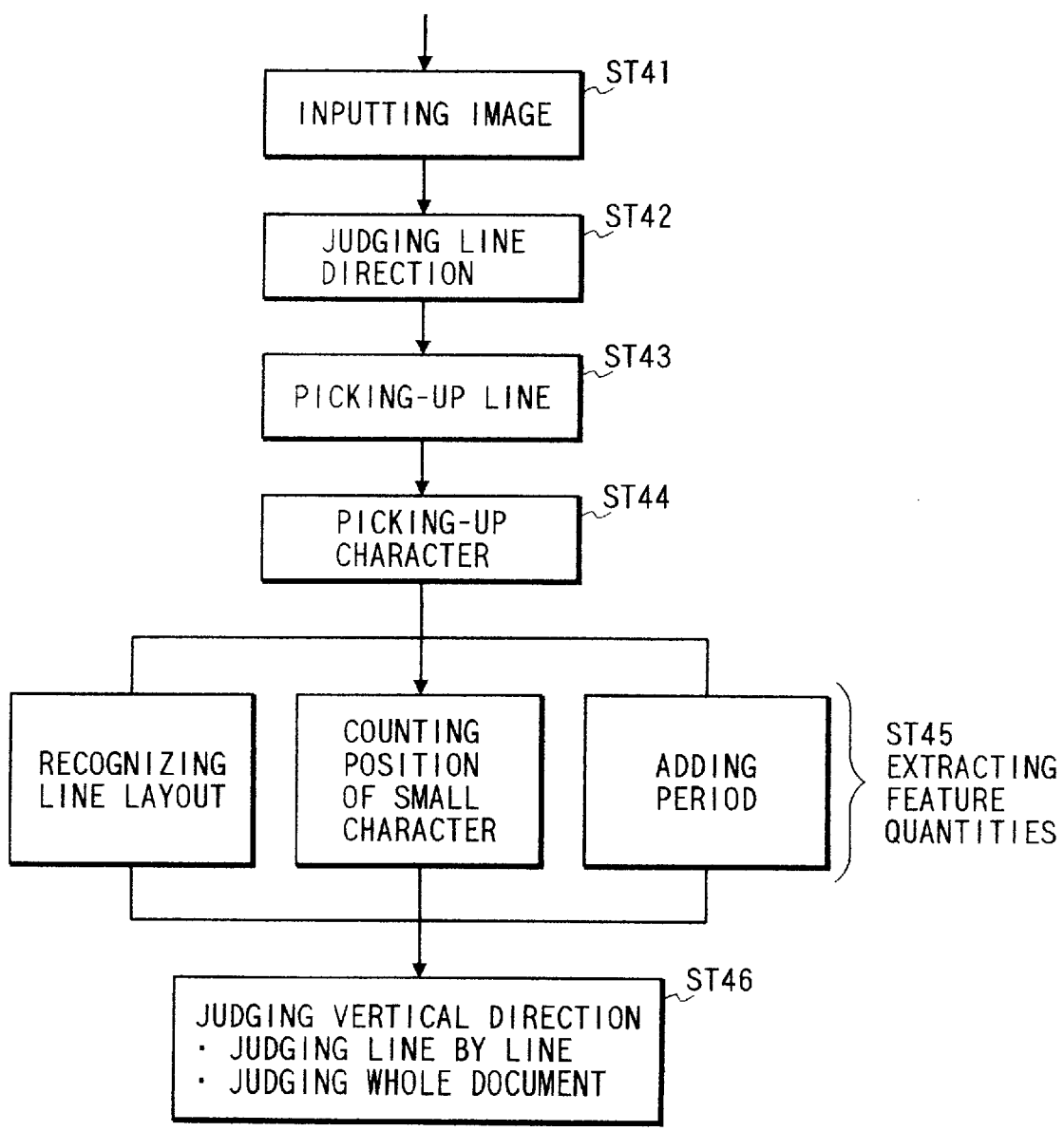

METHOD AND APPARATUS FOR DETECTING VERTICAL DIRECTION OF DOCUMENT

BACKGROUND OF THE INVENTION

1. Field of the Invention

The present invention relates to a method and an apparatus for detecting the vertical direction of a document, specifically, relates to an improvement of a technique for discriminating the top and the bottom of an image read out from an original document in a copying machine, a facsimile, an optical filing system, and the like.

2. Description of the Related Art

In the copying machine or the facsimile, the image is outputted in the same direction as of the image read out. The machine is frequently operated such that a number of documents, viz., the images thereon, are successively read out, processed, and outputted. In this case, if a document or documents of which the top and the bottom are reverse to those of the remaining documents are included in those documents, the documents of which the top and the bottom are reverse are outputted while keeping their vertical direction.

In using the copied documents, it is desirable or necessary to arrange the copied documents in the top and the bottom thereof for ease of subsequent handling of them.

In the facsimile or the optical filing system, the input image is transmitted to another station or stored in a memory device, while not printed out. In this type of the machine, it is necessary to arrange the documents in the top and the bottom thereof before the document images are read out. In the copying machine with a stapling function, the printed out documents are arranged and stapled together at a preset position or positions. Accordingly, also in this machine, the documents must be arranged in the top and the bottom thereof before the image reading operation.

A large document, such as a large book, is set on the machine while being spread. In this state, the pages of the book spread are alternately read, so the top and the bottom of the first copied page are inverted with respect to those of the second copied page.

It is desirable that before processing a set of documents, a machine checks the vertical directions of the images on the documents, and if a document bearing an image whose vertical direction is inverted is included in those documents, the machine automatically turns (by 180°) the inverted document and sets it in a correct vertical direction. By so doing, the machine is operated without taking any care on the vertical directions of the documents, and the printed out documents are all arranged in the same vertical direction.

The apparatus for detecting the vertical direction of an image on a document to be processed are disclosed in Unexamined Japanese Patent Publication (kokai) Nos. Hei. 5-110814 and 5-274334.

The apparatus disclosed in the publications is based on the optical character recognition (OCR) technique, and the former is applied to the copying machine. A specific number of characters are picked up from an input image, and recognized character by character to detect the vertical direction of the characters. If the vertical direction of the character is different from a preset one, the image data is turned by a preset angle.

The apparatus of the latter publication is applied to the optical filing system. The apparatus recognizes characters on a document on the assumption that the characters are vertically oriented in a preset direction. If recognizing at least a preset number of characters, the apparatus judges that the document is oriented in the preset direction. Then, the apparatus stored the readout data into an optical disc. When the number of the recognized characters is smaller than the preset number, the apparatus judges that the document is inverted, and inverts the readout image and then stores the inverted one into the optical disc.

In those vertical direction detecting apparatuses, the characters contained in the image on the document are recognized, so that much time is taken for the judging the vertical direction of the image on the document. The system for recognizing the characters is large in scale. For this reason, the copying machine, for example, is not provided with the character recognition system. If one attempts to incorporate the vertical direction detecting function into the copying machine, the character recognition system must be coupled with the machine. As a result, the copying machine is increased in size and cost.

SUMMARY OF THE INVENTION

It is an object of the present invention to provide a method and an apparatus for reliably detecting the vertical direction of an image, such as characters, on a document, without recognizing the characters character by character and by a simple and small system.

The method for detecting a vertical direction of an image on a document according to the present invention is comprised of the steps of: picking up given lines from an image on a document to be processed; picking up characters contained in the picked up lines; extracting a feature quantity from the data of at least one of the picked up lines and characters; judging a vertical direction of the characters contained in the lines line by line on the basis of the feature quantity; and specifying the vertical direction of the characters on the entire image on the basis of the vertical directions detected line by line.

In the present invention, the vertical directions of the characters contained in the lines are judged, every line, on the basis of the feature quantities of the lines. The vertical direction of the entire image is then judged by using the number of the lines whose vertical directions are judged. If some errors are contained in the extraction of the feature quantities and the judgement based on the extracted feature quantities, the errors are reduced to be negligible in judging the vertical direction of the entire image. No use of the character recognition process increases the speed of judging the vertical direction of the image on the document. No need of processing all of the characters allows the characters of small feature quantities to be excluded from the characters to be used for the vertical direction judgement. The reliability of the judging results is improved.

BRIEF DESCRIPTION OF THE DRAWINGS

In the accompanying drawings,

FIGS. 7A and 7B are diagrams for explaining the functions of a line layout recognizing means in the vertical direction detecting apparatus of FIG. 1;

FIGS. 8A to 8D are diagrams for explaining the functions of a small-character position counting means in the vertical direction detecting apparatus of FIG. 1;

FIGS. 9A to 9C are diagrams for explaining the functions of a period special process means in the vertical direction detecting apparatus of FIG. 1;

FIG. 11 is a diagram for explaining the functions of the period special process means;

FIG. 12 is a flowchart showing a method for detecting the vertical direction of an image on a document, which is employed in the vertical direction detecting apparatus of FIG. 1;

PREFERRED EMBODIMENTS OF THE INVENTION

A method and apparatus of the present invention for detecting the vertical direction of an image, such as characters, on a document will be described with reference to the accompanying drawings.

Figure 1:
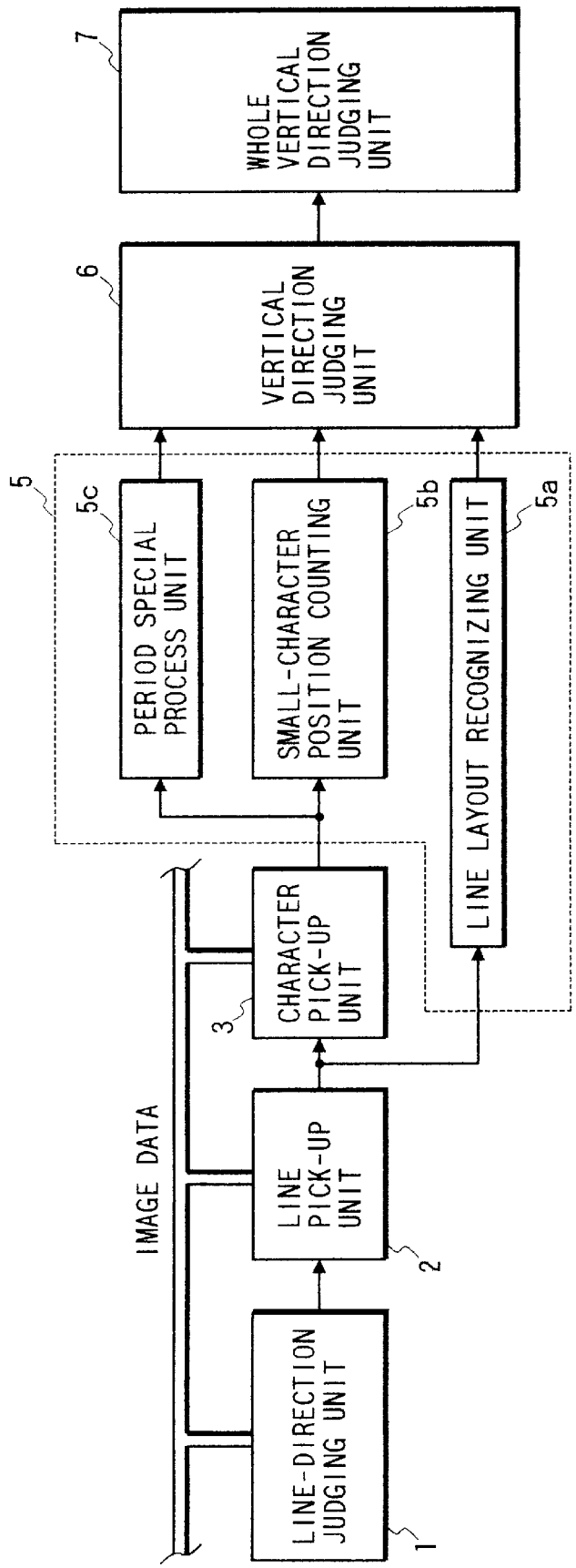
FIG. 1 is a block diagram showing an apparatus for detecting the vertical direction of an image on a document according to a first embodiment of the present invention.

FIG. 1 shows an apparatus for detecting the vertical direction of an image on a document, which is an embodiment of the present invention. The apparatus will be referred frequently to as a vertical direction detecting apparatus. As shown in the drawing, image data is transferred through a bus to a line-direction judging unit 1, a line pick-up unit 2, and a character pick-up unit 3. Coordinates data, which result from the line-direction judgement, the detection and the like, are transferred among those unit 1, 2 and 3. The units 1 to 3 get the image data to be processed through the image bus. With this, the amount of data transferred among the units 1 to 3 is reduced to realize a high speed processing.

The data, which are received by the line pick-up unit 2 and the character pick-up unit 3, are transferred from these unit to a feature-quantity extracting unit 5. The feature-quantity extracting unit 5 extracts feature quantities necessary for judging the vertical direction of an image, e.g., characters, on the document, from the received data, and transfers the extracted feature quantity to a vertical direction judging unit 6. The vertical direction judging unit 6 judges the vertical direction of characters in each lines. The output of the vertical direction judging unit 6 is transferred to a entire vertical direction judging unit 7. The entire vertical direction judging unit 7 judges the vertical direction of the characters in the picked up lines in an entire document on the basis of the results of the judgement made by the vertical direction judging unit 6, to thereby judge the vertical direction of the characters in the document, "upward" or "downward". The system for picking up an image on the document, generating image data, and supplying the image data to exterior may be a known image input terminal (image reader) of an image forming machine, such as a copying machine or facsimile machine, into which the vertical direction detecting apparatus of the invention will be incorporated. Hence, no further description of the system will be given.

The line-direction judging unit 1 detects the direction of the character array in the document (to be read out), viz., whether the vertical direction (sub scan direction) of the document lies in each line or the lines are successively arrayed in the horizontal direction (main scan direction). More specifically, two optical density distributions are formed: one projected on the X - Y coordinates in which the X axis is horizontally extended and the other projected on the Y-axis is vertically extended, and the line-direction judging unit 1 judges that the lines are arrayed in the direction in which the density is more greatly varied.

Figure 2A:
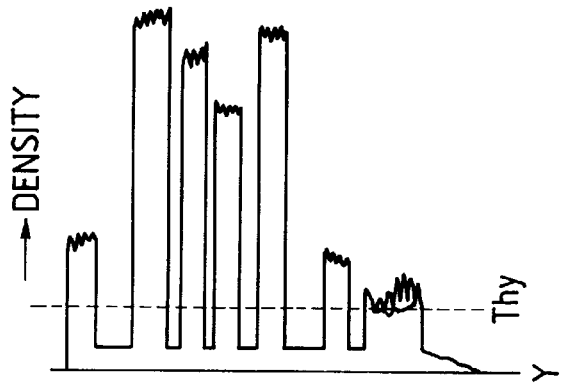
FIGS. 2A to 2C are diagrams for explaining the functions of a line-direction detecting means in the vertical direction detecting apparatus of FIG. 1.
Figure 2B:
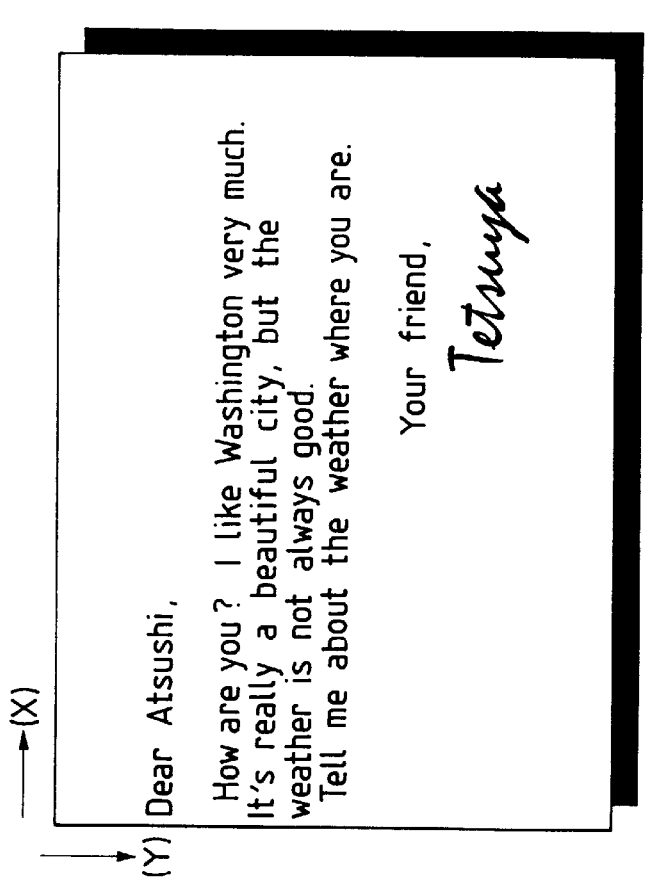
Figure 2C:
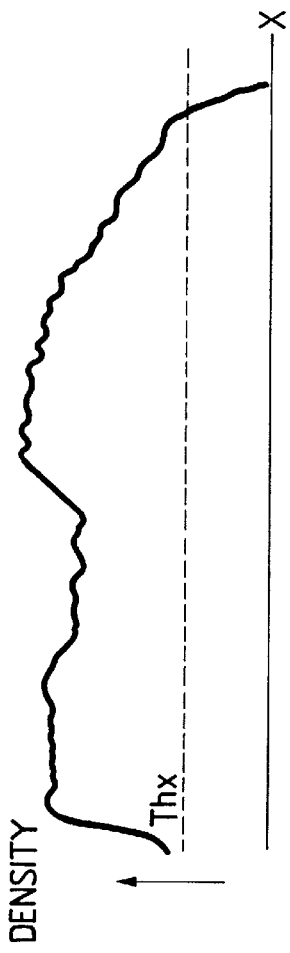

A specific example of the line-direction detecting process will be given. In this example, lines are extended in the main scan direction and vertically arrayed, as shown in FIG. 2A. A density distribution projected on the Y axis is shown in FIG. 2B. As shown, the density is high at the location of each line, but is low at the location where no line exists. A density distribution projected on the X axis is shown in FIG. 2C. As shown, a variation of the density is gentle, and its peak value is smaller than in the density distribution projected on the Y axis.

Accordingly, the line direction can be detected in a manner that the histograms of density values are charted and differentiated, and the line direction is judged on the basis of the results of the differentiating calculations. In another method of detecting the line direction, threshold values Thx and Thy are preset, and the histograms of density values projected on the X and Y axes are charted, and are compared with those threshold values Thx and Thy. The results of the comparisons are binarized. In the histogram of FIG. 2B, 0 values and 1 values are present, while in the histogram of FIG. 2C only 1 values are present. The line direction is judged on the basis of an occurrence of 0 values and 1 values. The result of the thus detected line direction is transferred to the line pick-up unit 2.

The line pick-up unit 2 detects the positions of the "lines" on a document (original document). Basically, the technique used for OCR is used for the line position detection. In the case of the OCR, the lines of the characters in a table must also be picked up since all of the characters must be read out. In the present embodiment, the characters in the table are not processed for the vertical direction detection. For this reason, the technique for detecting the line positions of the invention is different in details from that for the OCR.

Figure 3:
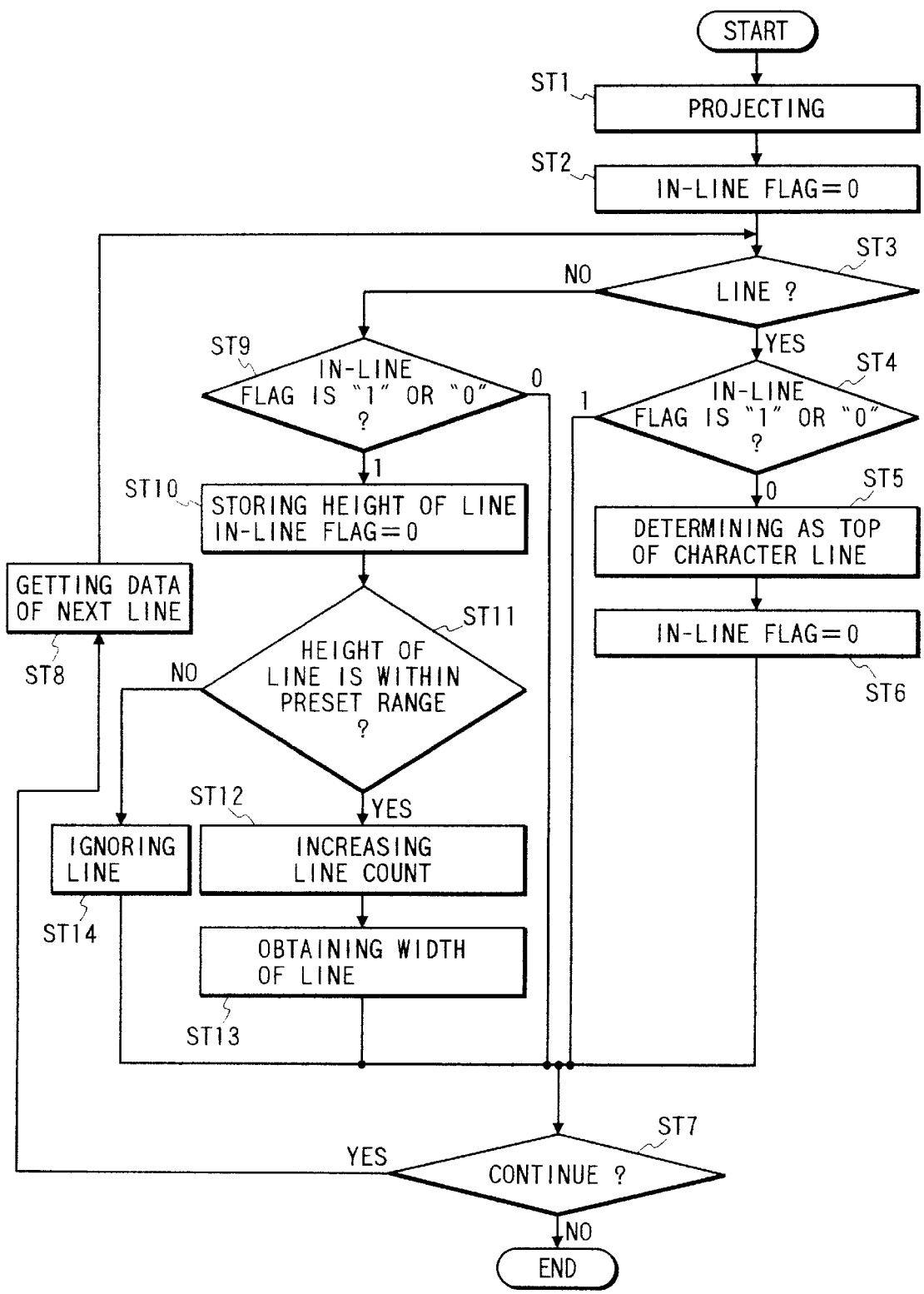
FIG. 3 is a flowchart showing the functions of a line pick-up means in the vertical direction detecting apparatus of FIG. 1.

The table includes ruled lines of a table frame, for example. There is a possibility that a pattern of the density distribution defined by only characters is varied by the presence of the density values of the ruled lines. If it is varied, an error will be caused in the determination process. To avoid this, the line consisting of only characters is picked up in the present embodiment. In the document, the portion including the character line is expressed by a character flag "1", while the portion not including the character line, by a character flag "0". Accordingly, in a character line, a point where an in-line flag is changed from "0" to "1" lies in the head of the line. A portion where "1"s successively appear lies in the line per se. For the in-line flag, "1" is assigned to a line constituting the character line. As a general rule, "1" is assigned to it when a density value projected is a preset value or larger. A specific line-position detecting process by the line pick-up unit 2 is flowcharted as shown in FIG. 3.

The line pick-up unit 2 receives the result of the line-direction detecting process from the line-direction judging unit 1, and forms a density histogram by projecting density values on a given axis again (ST1). The density histogram formed here is the same as the histogram of a greater density variation, which is one of the histograms formed by the line-direction judging unit 1.

Then, the line pick-up unit 2 resets the in-line flag to "0", and successively checks the lines from the first line to the subsequent ones as to if the line constitutes a character line (steps ST2 and ST3). In this case, the line is judged to be the line constituting the character line if either of the following conditions is satisfied: 1) The projected density value obtained in the step ST1 is larger than a reference value, and 2) the projected density value is smaller than the reference value but a difference of the projected density value of the present line and that of the preceding line is larger than the reference value. When a preset number of characters are included in the line, the projected density value is large. This case corresponds to the condition 1) above. When the number of characters included in the line is small, the projected density value is small but larger than that of the line occupying the space between the adjacent lines. Therefore, the difference between the projected density value of the present line and that of the preceding line is large. This case corresponds to the condition 2) above.

If the line constitutes a character line in the step ST3, it is checked whether the present in-line flag is "1" or "0". If it is "0", the character line starts from the line and hence the line pick-up unit 2 judges that the present line is the top of the character line (ST5), and sets the in-line flag to "1" (ST6). If the process to pick up the character line is further continued, the line pick-up unit 2 gathers data (projected density values) of the next line, and returns to the step ST3 (steps ST7 and ST8). The line pick-up process ends when the total number of the picked up lines exceeds a preset value. If the total number of the picked up lines is below the preset value, the line pick-up process ends when no further line to be processed is present. If the in-line flag has been set to "1" in the step ST4, the line pick-up unit 2 jumps to the step ST7 unconditionally.

If the line does not constitute a character line in the step ST3, the line pick-up unit 2 goes to a step ST9. In this step, the line pick-up unit 2 judges whether the present in-line flag is "1" or "0". If it is "0", the line is the space between the character lines, and hence the line pick-up unit 2 jumps to the step ST7 unconditionally, and enters the process of the next line. If the in-line flag is "1", the process proceeds to the line-to-line space while keeping the present line. More exactly, the previous line constitutes the character line. Then, the height of the line (the height value of the highest character of those characters contained in the character line) is obtained (the difference between the top of the line judged in the step ST5 and the previous line), and the in-line flag is reset to "0" (ST10).

The line pick-up unit 2 checks if the height of the line is within a preset range, and if the answer is YES, the line count is incremented by one (ST12), and the width of the line is obtained (ST13). Then, the line pick-up unit 2 goes to the step ST7. In this step, the line pick-up unit 2 calculates a distance between one end and the other end of a histogram within the range that can be considered as one line (see FIG. 6). The process for extracting the line width is provided for increasing an extracting process in the character pick-up unit 3. This process is not essential to the present invention. In the present invention, it is sufficient if the portion (line) where the character line lies is understood.

Figure 4:
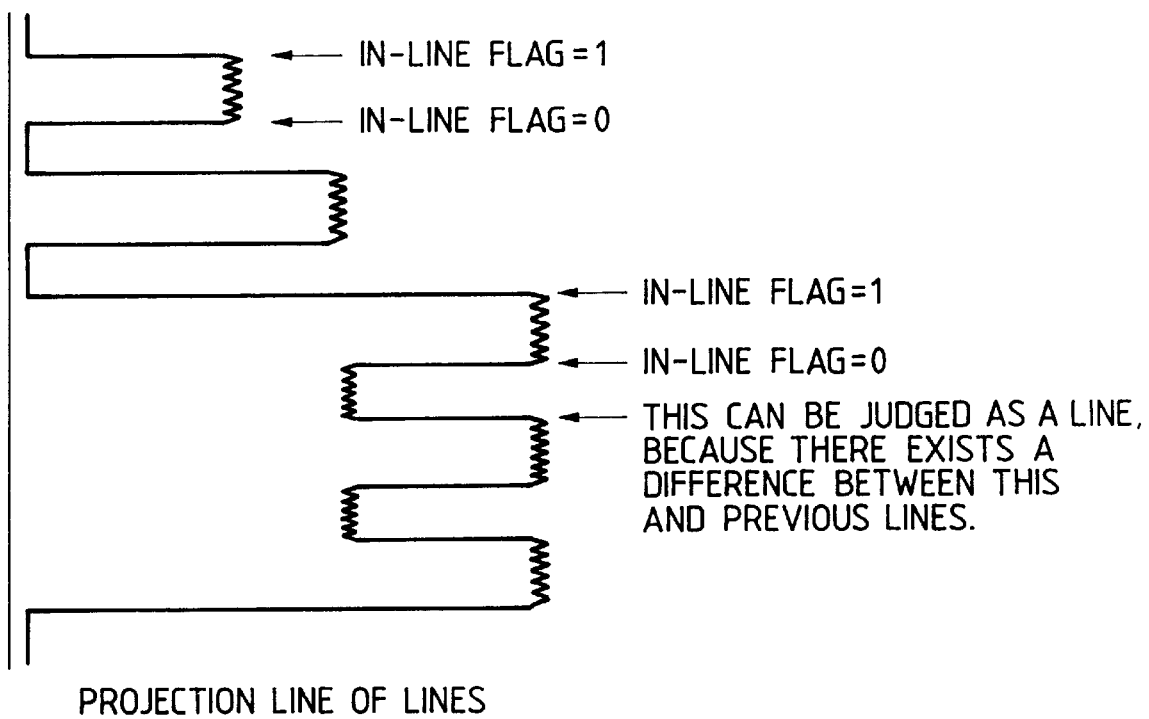
FIG. 4 is a diagram for explaining the operation of the line pick-up means.

If the height of the line is out of the fixed range in the step ST11, the line pick-up unit 2 judges that it is not the line, that is, it is not treated as the line to be processed (for extracting the feature quantity). The reason for this is that when it is larger than a preset range, it may be a graphic image, and when it is smaller than the preset range, it may be not the character. An example of the result of carrying out such a process is shown in FIG. 4.

The line pick-up unit 2 correlates the coordinates data of the portion of the image picked up as a line, i.e., the line number corresponding to the top of the line judged in the step ST5, the line number (the line number of the line preceding to the line where the contents of the in-line flag is changed to "1") of the last line of the successive lines subsequent to the line number of the top of the line, and the line width (the coordinates of the head and the tail of the line) extracted in the step ST13. Then, the line pick-up unit 2 transfers the result of the correlated data to the character pick-up unit 3. The same also transfers the density value histogram data of the picked up line portion to a line layout recognizing unit 5a of the feature-quantity extracting unit 5. Alternatively, only the line number data of the line where the character line exists is transferred to the line layout recognizing unit 5a. The line layout recognizing unit 5a directly reads necessary data from the image bus on the basis of the received data.

Figure 5:
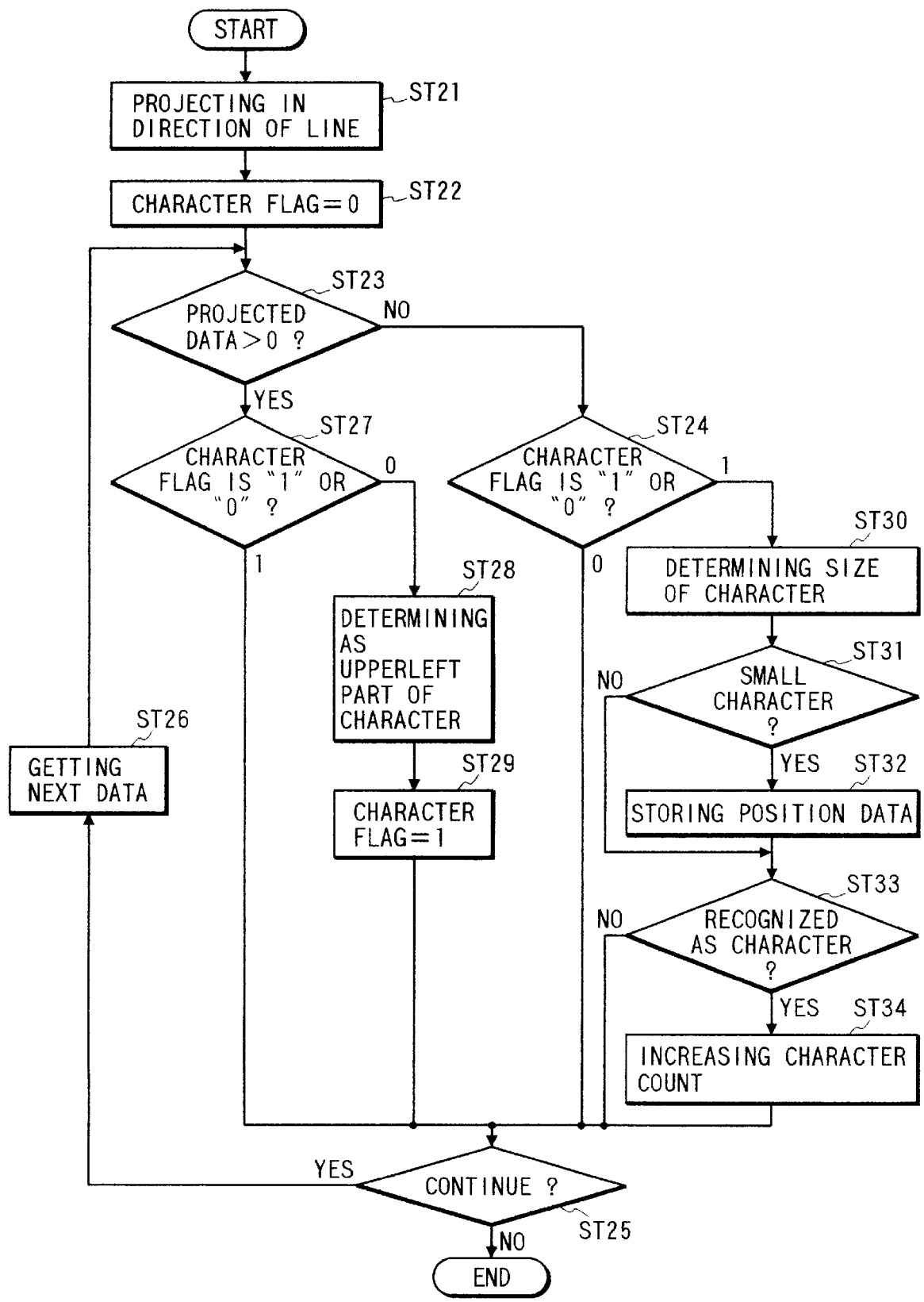
FIG. 5 is a flowchart showing the functions of a character pick-up means in the vertical direction detecting apparatus of FIG. 1.

The character pick-up unit 3 detects characters contained in the lines picked up, and carries out the pick-up process every character. The character pick-up process basically depends on the OCR technique. However, in this case, there is no need of recognizing all of the characters, and only the characters that can (or may readily) be used for the processing for determination are picked up. A specific character pick-up process, carried out by the character pick-up unit 3, is flowcharted in FIG. 5.

Figures 6A, 6B:
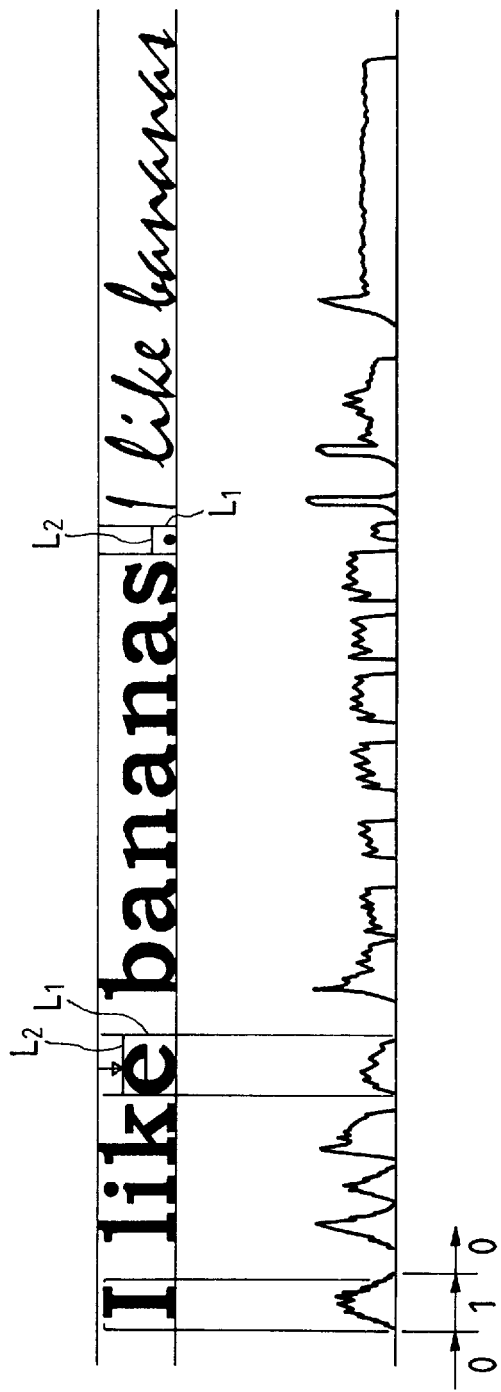
FIGS. 6A and 6B are diagrams for explaining the operation of the character pick-up means.

In the flowchart, a density distribution is projected, every line, on the axis extending in the direction of the line, to thereby form a density histogram (ST21). For a series of characters as shown in FIG. 6A, for example, the resultant histogram is as shown in FIG. 6B. A character flag is reset to "0" (ST22). In the character flag, "1" is assigned to a character portion of the line, and when the character flag is set to "1" when a density value projected (projected data) exceeds a preset value.

The character pick-up unit 3 successively gathers the projected data of the line from the head of the line, and checks if the projected data exceeds "0". If it is "0", the present portion of the line includes a character therein and the character pick-up unit 3 jumps to a step ST24. In this step, the character pick-up unit 3 checks whether or not the character flag is "0" or "1". If it is "0", the character pick-up unit 3 goes to a step ST25. In the step, the character pick-up unit 3 judges whether or not the process is to be continued. The decision is made depending on whether or not the tail of the line has been processed. If the process does not reach the tail of the line, the character pick-up unit 3 goes to a step ST26. In the step, the character pick-up unit 3 gets the next projected data along the array of characters, and returns to the step ST23. As for the judgement of the tail of the line, when a state that the projected density value is 0 is continued for a preset period of time, the current position is judged to be the tail of the line. Use of the process to judge the tail of the line brings about some advantages. For example, in a case where the line is the last line in a paragraph, and a marginal space is continued from the tail of the line to the side of the document from the tail edge of the last line, the tail judging process eliminates the wasteful searching of the space (density value of 0), to thereby increase a processing speed. Further, in a case where graphics or tables, which are not processed, are depicted in the marginal space continued from the tail of the line, the process of detecting such graphics or tables is not carried out.

When the projected data is larger than "0", the current portion contains a character, and then character pick-up unit 3 jumps to a step ST27. In the step, the character pick-up unit 3 judges whether the present character flag is "0" or "1". If it is "0", the character pick-up unit 3 judges that the corresponding portion of the line is the upper left part (head) of the character (ST28), and the coordinates data of that portion is stored into a related memory. Then, the character pick-up unit 3 sets the character flag to "1", and goes to the step ST25 where it continues the process. If the character flag is "1" in the step ST27, the corresponding portion is a mid portion of the character. Then, the character pick-up unit 3 straightforwardly goes to the step ST25.

When the process reaches the end part of the character portion, the answer in the step ST23 is "NO", and the answer in the step ST24 is "1". In this case, the process proceeds to a step ST30. In this step, the character pick-up unit 3 picks up the character preceding to the present one. In the character pick-up process, the character size is first detected. Specifically, the height of the character is detected. A character existing area (character width) lies in the portion (between phantom lines L1 in FIG. 6A) where "1"s of the character flag successively recur. Accordingly, the upper side (indicated by a phantom line L2 in FIG. 6A) of each of the parts to be considered as characters in that portion, is detected. The lower side (indicated by a phantom line L3 in FIG. 6A) of each of the parts to be considered as characters is also detected. The difference between the upper and the lower sides L2 and L3 is the height of the character. The normal OCR detecting process may be used for detecting the ends of the character.

After the character size is thus obtained, the character pick-up unit 3 judges whether the character is a small letter or character or a capital letter or character (ST31). Specifically, the character is judged to be a small character if the character has the height and the width more than 5% and less than 50% of the corresponding ones of the character of the standard size in the line where the characters under judgement exist. The height of the standard size is substantially equal to the height of the line picked up. Accordingly, it may be simply ruled that the height of the character is ½ or lower of the height of the line, for the small character discrimination. By the small/capital character judging process, "punctuation marks" and "small letters" are extracted. Some of the small letters are higher than the ½ height of the line. Accordingly, the smaller letters are extracted except some types of small letters. However, no problem arises in practical use.

If the character under recognition is a small character, the character pick-up unit 3 stores the position data (coordinates data) of the character (ST32). If it is not a small character, the character pick-up unit 3 directly goes to the step ST33. In the step, the character pick-up unit 3 judges whether or not the picked up portion is recognized as a character. If it is recognized as a character, the character count (the total number of characters contained in the line) is incremented by one (ST34). In this case, when the character width is shorter than a preset reference value (e.g., three times as long as the height of the line), the picked up portion is recognized as a character. With this, the characters coupled so as not to be separated are excluded from those characters to be recognized.

The inner construction of the feature-quantity extracting unit 5 will be described. In the present embodiment, the feature-quantity extracting unit 5, as shown in FIG. 1, is made up of a line layout recognizing unit 5a, a small-character position counting unit 5b, and a period special process unit 5c. These three unit are not always required for the present invention, but at least one unit suffices for the present invention.

The line layout recognizing unit 5a extracts the feature quantity every line on the basis of the line data picked up by the line pick-up unit 2. More specifically, it shades off the image data, and forms normalized density value histograms. In the shading off process, the height of the line is divided into an n number of segments, and the array of characters is divided into an m number of segments.

A specific process carried out by the line layout recognizing unit 5a follows. A density histogram of a line containing a series of characters as shown in FIG. 7A is projected on the axis extended in the height direction of the line. In the density histogram, the line is shaded off into units each consisting of a preset number of pixels. The histogram formed is normalized by enlarging and reducing it, to thereby be reshaped into a histogram as shown in FIG. 7B.

The histogram thus formed is compared with a number of reference patterns prepared in advance for the pattern matching. By the pattern matching process, it is judged whether or not the reference pattern having a degree of the matching in excess of a preset value is present in connection with the pattern of the histogram of the picked up image data. The reference patterns of different vertical directions (normally erected/inverted) are stored in the related memory in a manner that a shaded-off histogram of a number of series of reference characters each being normally erected and a shaded-off histogram of a number of series of reference characters each being inverted.

Accordingly, for the reference pattern that is judged to have a high degree of matching in the pattern matching process, the line layout recognizing unit 5a checks "to be upward" or "to be downward" of the line on the basis of the stored information of the top and the bottom. In a case where the reference pattern having a high degree of matching is not found, or a plural number of the reference patterns each of a high degree of matching are found and but the vertical direction of the characters of the line is inverted, the unit judges that the vertical direction of the image is indefinite. Thus, the line layout recognizing unit 5a completes the above-mentioned process, and transfers three types of the results of judging those lines, "upward", "downward", and "indefinite", and the line number of the lines as well, to the vertical direction judging unit 6. As known, characters are written vertically or laterally in the document. The "vertical writing" and the "lateral writing" of the document may be handled while not attendant with any problem, by patterning those and storing the resultant patterns.

The small-character position counting unit 5b extracts the feature quantity from the small character data received from the character pick-up unit 3, every line. More specifically, it is assumed that of the small characters extracted by the character pick-up unit 3, the number of those characters located above the line is denoted as Au, while the number of those characters located under the line, as Al. Then, the small-character position counting unit 5b makes the following decisions: if Au<Al, the vertical direction of the characters is "upward" (normally erected); if Au>Al, it is "downward" (inverted); if Au=Al, it is indefinite. "Punctuation" and "small characters such as double consonants" are written under the line. Accordingly, if those characters frequently appear under the picked up line, it may be judged that the vertical direction of the characters in the line is "upward". Conversely, if the characters frequently appear above the picked up line, it may be judged that the vertical direction is "upward".

The small-character position counting unit 5b transfers three types of the results of judging those lines, "upward", "downward", and "indefinite", and the line number of the lines as well, to the vertical direction judging unit 6. Some of the characters are located above the line, although those are judged to be small characters. An example of such characters is a symbol """. Most of the characters are correctly judged through the above-mentioned comparing process. If the line top/bottom judgement based on the small character position is mistaken, there is a high probability that the final judgement will be correct since the line layout recognizing unit and the punctuation special processing unit will make the correct judgement. If those other processing unit make a misjudgment on the top/bottom of the line, but the top and the bottom of another line is correctly judged, an overall evaluation will provide a correct judgement, and no problem arises.

An example of the process will be described. Characters are picked up from a line containing a series of characters as shown in FIG. 8A. Then, eight small characters "e", "a", "n", "a", "n", "a", "s", and "." are detected. The small-character position counting unit 5b judges whether these eight characters are positioned in the upper or the lower part in the line (FIG. 8B) (it specifies the positions of the characters on the basis of the top (denoted as L2 in FIG. 6) of each character and the bottom (denoted as L1 in FIG. 6) thereof.). In the example illustrated, the number (Au) of the small characters positioned in the upper part in the level is zero (Au=0), and the number (Al) of the small characters positioned in the lower part in the line is eight (Al=8) (FIG. 8(C)). The vertical direction of the line in question is judged to be "upward" (FIG. 8(D)).

The judging references are based on the assumption that the characters are laterally written in the document. The reason for this is that many documents of the "lateral writing" are used in recent days. In the processes of extracting other two feature quantities, the "vertical writing" and the "lateral writing" may be taken into consideration. Accordingly, no problem arises from the use of the "lateral writing" for the judging references. The process of judging the top/bottom of the line may be carried out after the writing style of the document is judged to be the "vertical writing" or the "lateral writing", as will be described later. In this case, a more exact judgement is secured.

The period special process unit 5c judges the top or the bottom of the picked up line on the basis of a process at the head or the tail or end of a line (the end of a sentence). In a case where a period "." is present at the end of a picked up line containing a series of characters being normally erected, as shown in FIG. 9A, the shape of the tail of the line is protruded in the lower part as shown. In a case where the vertical direction of the characters contained in the picked up line are inverted as shown in FIG. 9B, the shape of the head of the line is protruded in the upper part as shown. The period special process unit 5c judges the vertical direction of the characters in the picked up line to be "upward" or "downward" on the basis of the shape of the head or the tail of the line (FIG. 9C).

Actually, the period special process unit 5c does not judge the shape of the head or the tail of the line. It checks whether or not a small character is present at the head or the tail of the line, and if it is present, checks whether the small character is positioned in the upper part or the lower part in the picked up line. If the smaller character is not present, the period special process unit 5c judges that the vertical direction of the image is indefinite. The result of the judgement made by the period special process unit 5c is transferred to the vertical direction judging unit 6.

Figure 10:
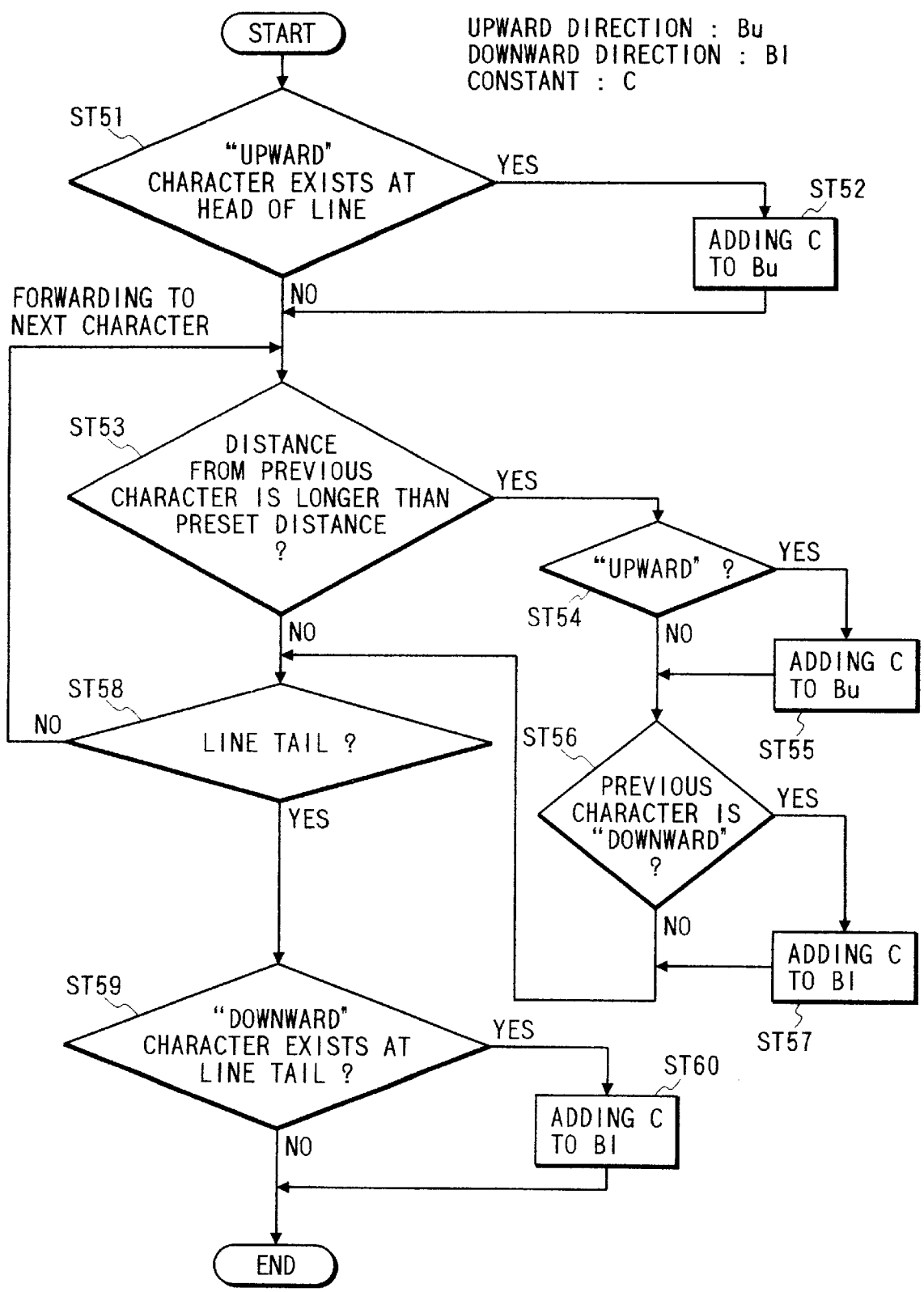
FIG. 10 is a flowchart showing the functions of the period special process means.

A specific process for exercising the function of the period special process unit 5c is flowcharted in FIG. 10. When a period is positioned in the upper part of the head of the line (ST51, ST 54), a constant C (2 in this instance) is added to an adding point Bu (ST52, ST55). When a period is positioned in the lower part of the head of the line(ST 51, ST 59), a constant C (2 in this instance) is added to an adding point Bl(ST57, ST60). In a case where a space of a preset distance or longer follows a series of successively recurring characters in the picked up line, as shown in FIG. 11, it is judged that the series of characters terminates there(ST53, ST58).

There is a case where sentences forming different setups are contained in one line, as in the case of multi-setup. In this case, those sentences are processed by the point additive process (In the drawing, the slanted portions are subjected to the adding point character judgement). In a case where a plural number (two in the instance illustrated) of sentences are present in one line, and the sentences contain the corresponding characters, these are added. Accordingly, in the instance illustrated, one of the additive points Bu and Bl may be 4 or each of the additive points Bu and Bl may be 2.

The above-mentioned process is applied to the document of "lateral writing" style, but it may be applied to the document of "vertical writing" style. In the case of "vertical writing", the shape of the line head is protruded in the lower part, and the shape of the line tail is protruded in the lower part. The shape of the head and the shape of the tail are simultaneously judged, whereby the top/bottom judgement can be made every line irrespective of the "vertical writing" and the "lateral writing". The "vertical writing" or the "lateral writing" may be judged in advance by using this judging process.

If the judgement judges that the writing style is the "vertical writing", a higher accuracy is secured if the process of the small-character position counting unit 5b is inverted.

The vertical direction judging unit 6 synthetically judges the results of judging those lines, the "upward", "downward" or "indefinite" on the basis of the feature quantity data, which are received from the line layout recognizing unit 5a, the small-character position counting unit 5b and the period special process unit 5c in the feature-quantity extracting unit 5. Specifically, the process is carried out as shown in Table 1.

TABLE 1

|  | Au | Al | |
|---|---|---|---|
|  | Bu | Bl | (from small-character position counting unit 5b) |
|  |  |  | (from period special process unit 5c) |
| +) | Cu | Cl | (line layout recognizing unit 5a) |
|  | Su | Sl | (Total) |

Su < Sl → ↑
Su > Sl → ↓
Su = Sl → indefinite

In the table, Au, Al, Bu and Bl are the small character position count values, and the adding points based on the period. Cu and Cl are the values resulting from the recognition process by the line layout recognizing unit 5a. When the line layout recognizing unit 5a judges that the vertical direction of the characters is "upward" (normally erected), Cl=1 and Cu=0. When it judges that the vertical direction of the characters is "downward" (inverted), Cl=0 and Cu=1.

The vertical direction judging unit 6 compares the sum Su of Au, Bu and Cu with the sum Sl of Al, Bl and Cl. If Sl is larger than Su, the vertical direction judging unit 6 judges that the vertical direction of the characters in the line is "upward". If Sl is smaller than Su, it judges that the vertical direction is "downward". If Sl and Su are equal to each other, it judged that the vertical direction is indefinite. The results of the vertical direction judgements are transferred to the entire vertical direction judging unit 7. Specifically, the process is carried out as shown in Table 2.

TABLE 2

↑: N lines N>R → entire document: ↑
↓: R lines N<R → entire document: ↓
indefinite: U lines The entire vertical direction judging unit 7 sequentially receives the results of the vertical direction judgements made every line, from the vertical direction judging unit 6, and accumulatively adds them. By the addition, the judging unit 7 counts the number N of the lines judged to be "upward" in the vertical direction, and the number R of the. lines judged to be "downward". The judging unit 7 compares the numbers N and R of the lines on the data gathered from a preset image area. When the number N of the lines is larger than the number R, the entire vertical direction judging unit 7 judges that the vertical direction of the image on the document is "upward", and that in the reverse case, the vertical direction of the image is "downward". The entire vertical direction judging unit 7 transfers the result of the decision to the related image processing apparatus.

The vertical direction detecting apparatus thus far described sequentially judges the vertical direction of the image on the document from the top line of the document to the bottom line thereof. If required, the vertical direction judgement may be made on the data of the lines selected every preset number lines or the lines randomly selected. In a modification of the final judgement by the entire vertical direction judging unit 7, the numbers N and R of the lines are added together while being incremented. When the sum of (N+R) exceeds a preset number of value, the final judgment of the vertical direction is made. An odd number, for example, 11, is preferable for the preset number in order to secure a reliable judgement.

FIG. 12 is a flowchart showing a method of detecting the vertical direction of an image on a document, which is an embodiment of the present invention. As shown, an image on a document to be processed is inputted (ST41). The image data picked up is processed to form density histograms distributed in the main the sub scan directions. The line extending direction or line direction is detected on the basis of the histograms (ST42). Through this step, the directions defining the orientation of the document are reduced from the four directions to the two directions. The lines each consisting of characters are picked up on the basis of the line direction detected (ST43). The characters are picked up from each line (ST44). Feature quantities necessary for detecting the vertical direction of the characters written on the document are extracted (ST45). To this end, a pattern (a density histogram (shading-off image) projected on the axis extended in the height direction) over the entire line is compared with a reference pattern for the pattern matching. Through the pattern matching process, the vertical direction of the characters of each line is detected. The process of counting the positions of the small characters of those picked up characters, and the adding point process for processing the period of the head or the tail of the line are carried out. The vertical direction of the characters written on the document is judged on the basis of the extracted feature quantities (ST46). In this judging process, the vertical direction of the characters is judged every line. The number of the lines that are judged to be "upward" is compared with the number of the lines that are judged to be "downward". When the former is larger in number than the latter, it is judged that the characters on the entire document are directed to be "upward". As a result, the two directions defining the vertical direction of the characters is reduced to be one direction. In other words, the final decision of the vertical direction of the image on the document is made.

Figure 13:
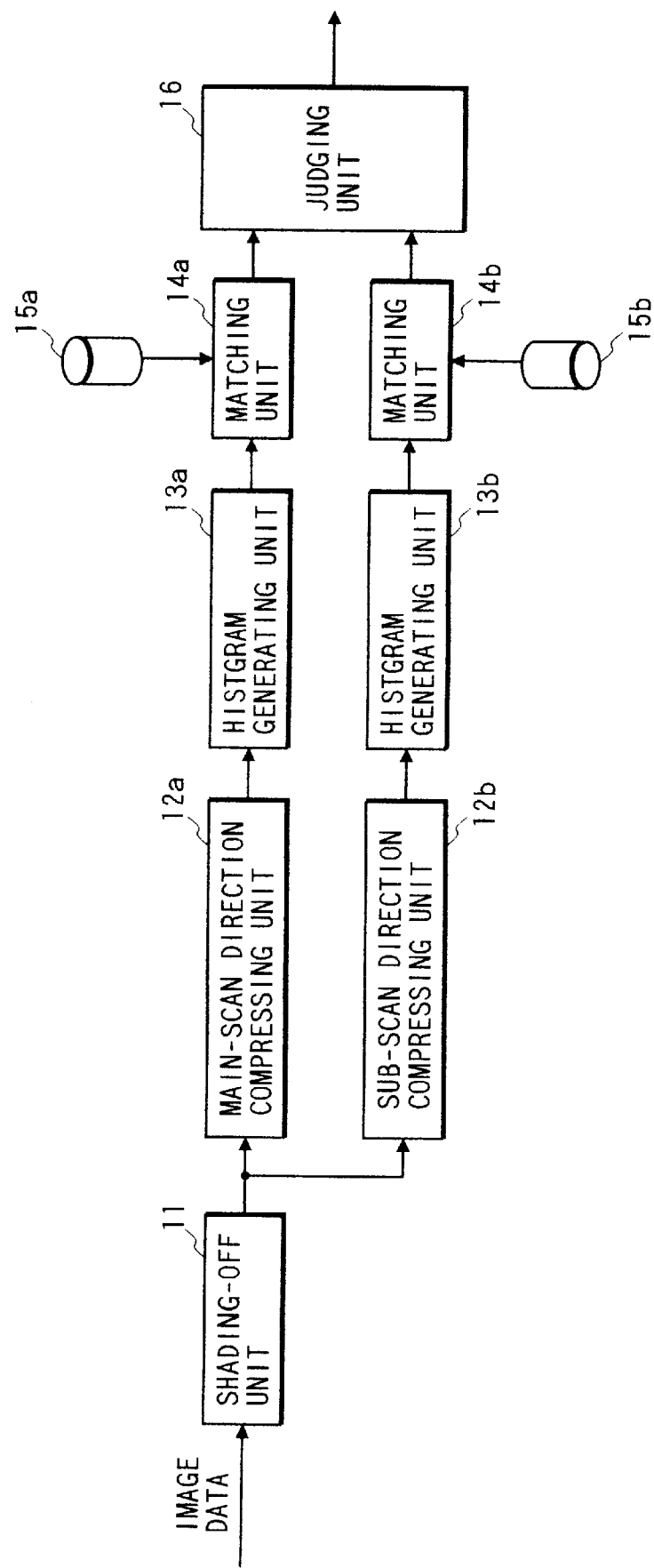
FIG. 13 is a block diagram showing an apparatus for detecting the vertical direction of an image on a document according to a second embodiment of the present invention.

FIG. 13 is a block diagram showing a second embodiment of a vertical direction detecting apparatus according to the present invention. As shown, received image data is applied to a shading-off unit 11 where the image data is shaded off into units each consisting of a preset number of pixels. In this case, the image data is shaded off to such an extent that one character forms one dot. In the present embodiment, a binarizing process is also carried out in the shading-off process.

The image data is transferred from the shading-off unit 11 to main-scan direction compressing unit 12a and sub-scan direction compressing unit 12b. Each of the compressing unit 12a and 12b compresses the image data in the corresponding direction. To be more specific, the main-scan direction compressing unit 12a divides the image data, in the main scan direction, into segmental image data each consisting of an m number of bits, while in the sub scan direction, leaving the image data (already shaded off). as it is. Accordingly, the image of the shaded-off data is divided into segmental areas of 1×m. If the number of black dots in a segmental area is greater than or equal to a preset number of dots, that area is converted into a black area. If the number of black dots is less than the preset number of dots, that area is converted into a white area. The reference value is approximately 20 when m=24, and approximately 2 when m=4. Similarly, the sub-scan direction compressing unit 12b divides the image data, in the sub scan direction, into segmental image data each consisting of an n number of bits, while in the main scan direction, leaving the image data as it is. Accordingly, the image of the shaded-off data is divided into segmental areas of 1×n. As a result, the segmental image areas are compressed into black and white areas.

The output image data of the compressing unit 12a and 12b are transferred to histogram generating unit 13a and 13b, respectively. Each of the histogram generating unit 13a and 13b generates a histogram of black dots that is projected onto the axis extended in the scan direction in which the image data is not compressed. The histogram generating unit 13a and 13b send the generated histograms to matching unit 14a and 14b, respectively. The matching unit 14a compares the received histogram with a number of reference patterns stored in its associated storing unit 15a, for matching of them. If the reference pattern having a degree of the matching in excess of a preset value is present, the matching unit 14a sends a signal indicative of being matched to a judging unit 16. The same thing is true for the matching unit 14b and the storing unit 15b.

The reference patterns, which are stored in each of the storing unit 15a and 15b, are formed in a manner that the image data of a number of reference images are processed by two signal processing systems; one consisting of the shading-off unit 11, the main-scan direction compressing unit 12a, and the histogram generating unit 13a, and the other consisting of the shading-off unit 11, the sub-scan direction compressing unit 12b, and the histogram generating unit 13b. To be more specific, in the case of the reference images in which characters are linearly arrayed in the main scan direction, the reference images of which the characters are directed upward and the reference images of which the characters are directed downward are processed by the first signal processing system including the unit 11, 12a and 13a, to thereby generate reference patterns, and the resultant patterns are stored in the storing unit 15a. In the case of the reference images in which characters are linearly arrayed in the sub scan direction, the reference images of which the characters are directed upward and the reference images of which the characters are directed downward are processed by the second signal processing system the unit 11, 12b and 13b, to thereby form reference patterns, and the resultant patterns are stored in the storing unit 15b.

In the case of a document containing a description of the fixed format as shown in FIG. 2A, the density histogram of the document has a preset pattern. Therefore, the vertical direction of the characters written on such a document can be discriminated by the pattern matching process. In the document illustrated, the title is located at the head line of the document, and the body is spaced downward from the title by some lines. Accordingly, the space (where the density value is 0) between the title and the body is larger than each of the spaces among the remaining lines. In the body of the description of the document, the lines have substantially equal lengths, so that the peak values of the densities are also substantially equal in the density histogram. The document further contains "Your friend" under the body. For this reason, a small peak of the density appears under the body of the description of the document. A series of characters "Tetsuya" is further located under the "Your friend", so that a peak of the density appears under the peak of the "Your friend" in the density histogram. Thus, the description of the fixed format has a fixed pattern of the histogram. Some variation of the pattern can be reduced to be negligible by the shading-off process and the compressing process as referred to above. For this reason, an exact judgement on the vertical direction of the characters on a document is secured by using a relatively small number of reference patterns.

The judging unit 16 receives the results of the matching process from the matching unit 14a and 14b, and chooses one of fives items on the document direction, viz., four directions and indefinite, on the basis of the results. Specifically, when the matching process shows that the pattern of the histogram of the thus processed image data has a high degree of matching to one of the reference patterns, the judging unit 16 judges that the document is directed in the direction of the matched reference pattern. When it has a high degree of matching to the reference pattern of a different direction or a low degree of matching to any of the reference patterns, the judging unit 16 judges that the document direction is indefinite.

Figure 14:
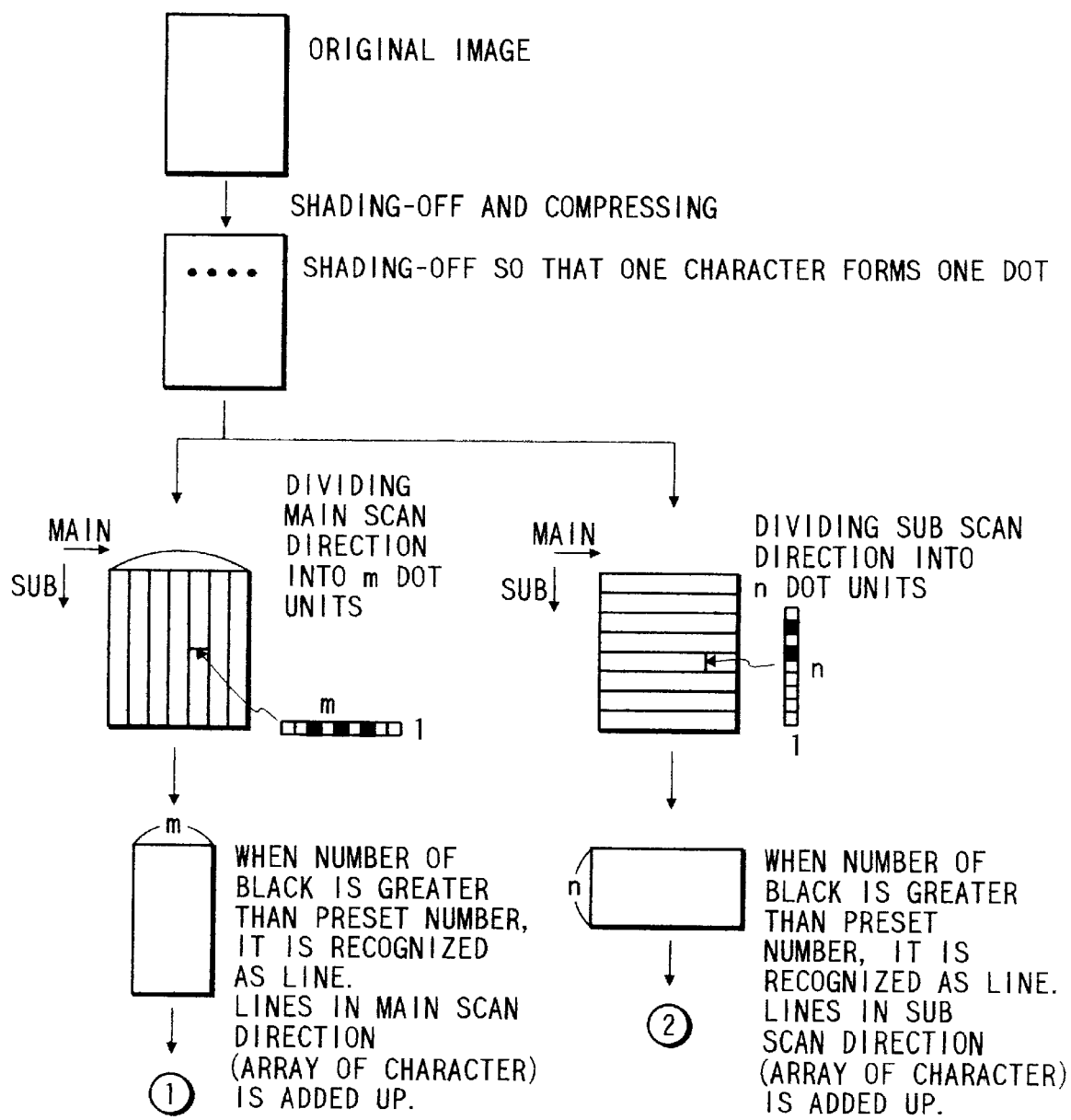
FIGS. 14 and 15 cooperates to show a flowchart for explaining a method for detecting the vertical direction of an image on a document, which is employed in the vertical direction detecting apparatus of FIG. 14.
Figure 15:
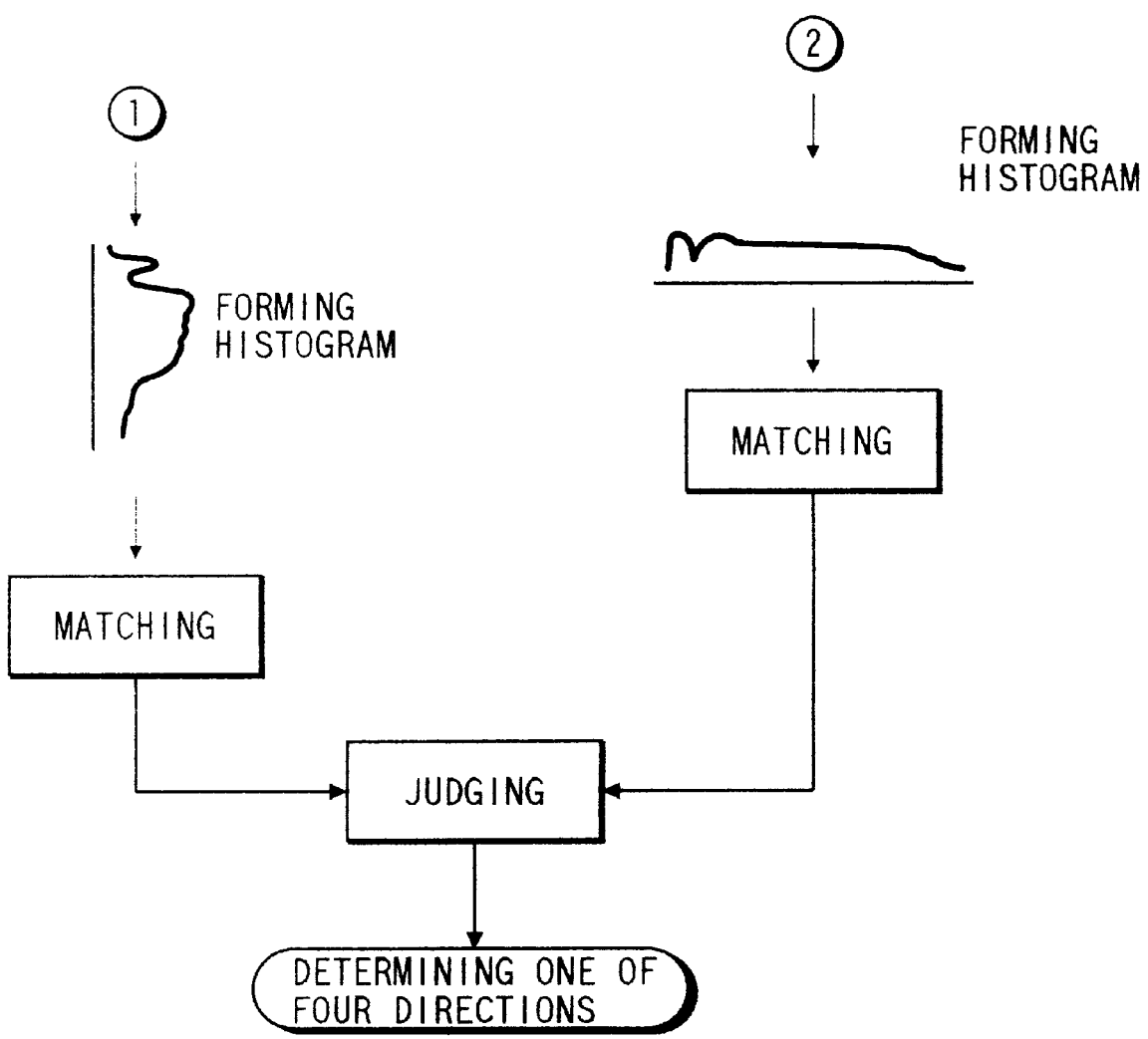

FIGS. 14 and 15 cooperate to show a method of detecting the vertical direction of characters written on a document, which is employed for the vertical direction detecting apparatus of the present invention. As shown in FIG. 14, an image on a document to be processed is picked up, to obtain image data. The image data is shaded off to such an extent that one character forms one dot. The shaded off image is inputted to the compressing unit 12a and 12b, so that the image data is compressed in the main scan direction (illustrated on the left side in the drawing), and in the sub scan direction (on the right side).

Each of the compressing processes is carried out in two steps. To begin with, the image data is divided into segmental image data each consisting of an m number of bits in the main scan direction, and segmental data each consisting of an n number of bits in the sub scan direction. If the number of black dots contained in each of the segmental areas defined by the segmental data is greater than or equal to a preset number, the character is present in the segmental image area and it is converted into a black pixel.

The histograms of the thus compressed image data are formed (FIG. 15). The patterns of the histograms are compared with the reference patterns for the pattern matching. The results of the matching process are determined to choose one of four directions. If it is impossible to choose any of the directions, it is judged that the document direction is indefinite.

The first and the second embodiments of the present invention thus far described may be combined. The combination of the first and the second embodiments as a third embodiment of the present invention will be described, not using drawings.

The vertical direction detecting apparatus of the second embodiment can exactly and quickly judge the vertical direction of the description of a fixed format on a document. When the format of the description is not fixed, the apparatus will frequently judge that the vertical direction of the description is indefinite. Therefore, the output of the judging unit 16 in the second embodiment is connected to a copying machine, for example, and also to the vertical direction detecting apparatus of the first embodiment. If the apparatus of the second embodiment judges that the vertical direction is indefinite, the apparatus of the first embodiment is operated for the final judgement on the vertical direction. In the third embodiment thus constructed, the apparatus of the first embodiment quickly judges those documents containing the descriptions of the fixed format, and the apparatus of the second embodiment exactly judges the documents containing the descriptions whose format is not fixed.

As seen from the foregoing description, in the method and apparatus of the present invention, which are for detecting the vertical direction of an image on a document, the histograms projected on the axes extended in the specific directions are used for detecting the vertical direction of the image on the document, while the character-by-character basis character recognition is used in the conventional art. That is, the present invention utilizes the shape features, such as histogram patterns, positions of small characters and the period, and the like, for detecting the vertical direction.

Therefore, a system for accurately detecting the vertical direction of the image on the document may be realized simply and with a small size.

What is claimed is:

1. A method for detecting an upside or downside vertical direction of an image on a document comprising the steps of:

picking up given lines from an image on a document to be processed;

picking up characters contained in the picked up lines;

extracting a feature quantity from at least one of the picked up lines and characters;

judging an upside or downside vertical direction of the characters contained in the lines on a line by line basis on the basis of the feature quantity;

specifying the upside or downside vertical direction of the characters on the entire image on the basis of the vertical upside or downside directions judged line by line; and before said step of picking up given lines, extracting characters of the image on the document to be processed in a main scan direction and a sub scan direction; and determining the direction of a line on the basis of the extracted characters.

2. A method according to claim 1, wherein said specifying step is performed when the number of the lines concerned in specifying the vertical direction exceeds a preset number of lines.

3. A method for detecting an upside or downside vertical direction of an image on a document comprising the steps of:

picking up given lines from an image on a document to be processed;

picking up characters contained in the picked up lines;

extracting a feature quantity from at least one of the picked up lines and characters;

judging an upside or downside vertical direction of the characters contained in the lines on a line by line basis on the basis of the feature quantity; and specifying the upside or downside vertical direction of the characters on the entire image on the basis of the vertical upside or downside directions judged line by line; and wherein said extracted feature quantity includes at least one of:
 a pattern of a density histogram formed by projecting a density value for each line on the axis extended in the height direction,
 positions of characters regarded as small letters, which are extracted from the picked up characters, the positions being defined in the height direction in the line at the extracted portions, and
 presence or absence of a part regarded as a period at the head or the tail of each picked up line.

4. An apparatus for detecting an upside or downside vertical direction of an image on a document comprising:

shading-off means for generating new pixel data on the basis of density values of a plural number of pixels presenting in a given local area on a given image;

main scan direction compressing means for compressing the shaded-off image received from said shading-off means in a main scan direction;

sub scan direction compressing means for compressing the shaded-off image received from said shading-off means in a sub scan direction;

histogram generating means for receiving the compressed data received from said main scan direction compressing means and said sub scan direction compressing means, and for generating histograms of the compressed data projected in an axis extended in a non-compressed direction;

matching means for comparing the patterns of the generated histograms received from said histogram generating means with preset reference patterns for the pattern matching; and judging means for judging an upside or downside vertical direction of the image on the basis of the reference pattern having a high degree of matching and the an upside or downside vertical direction data stored in pair, when a reference pattern having a high degree of matching to the output data from the matching means is present.

5. A method for detecting an upside or downside vertical direction of an image on a document comprising the steps of:

shading off a given image in a present manner;

compressing the shaded-off image in a main scan direction and a sub scan direction;

forming histograms of the number of pixels on the basis of the respective compressed image data;

comparing patterns of the formed histograms with reference patterns for a pattern matching to detect a reference pattern having a high degree of matching to each generated histogram; and specifying the an upside or downside vertical direction of the entire image on the basis of the data of the an upside or downside vertical directions based on the detected reference patterns.

6. A method according to claim 5, when the an upside or downside vertical direction is not specified in said specifying step, said method further comprising:

picking up given lines from the image on the document to be processed;

picking up characters contained in the picked up lines;

extracting a feature quantity from the data of at least one of the picked up lines and characters;

judging an upside or downside vertical direction of the characters contained in the lines line by line on the basis of the feature quantity; and specifying the an upside or downside vertical direction of the characters on the entire image on the basis of the upside or downside vertical directions detected line by line.

7. A method for detecting an upside or downside vertical direction of an image on a document according to claim 6, wherein said specifying step is performed when the number of the lines concerned in specifying the an upside or downside vertical direction exceeds a preset number of lines.

8. A method for detecting an upside or downside vertical direction of an image on a document according to claim 6, wherein said detected feature quantity including at least one of:

a pattern of a density histogram formed by projecting the density values of the lines on the axis extended in the height direction, positions of characters regarded as small letters, which are extracted from the picked up characters, the positions being defined in the height direction in the line at the extracted portions, and presence or absence of a part regarded as a period at the head or the tail of each picked up line.

9. A method for detecting an upside or downside vertical direction of an image on a document according to claim 6, further comprising the steps of:

before picking up given lines from an image on a document to be processed, extracting the components of an image on a document to be processed in the main scan direction and the sub scan direction; and determining the direction of the line on the basis of the extracted components.

* * * * *